(12) United States Patent
Boss et al.

(10) Patent No.: US 8,284,913 B2
(45) Date of Patent: Oct. 9, 2012

(54) ADAPTIVE CALL MONITORING

(75) Inventors: Gregory J. Boss, American Fork, UT (US); Barry M. Graham, Silver Springs, MD (US); Rick A. Hamilton, II, Charlottesville, VA (US); Timothy M. Waters, Hiram, GA (US)

(73) Assignee: International Business Machines Corporation, Armonk, NY (US)

( * ) Notice: Subject to any disclaimer, the term of this patent is extended or adjusted under 35 U.S.C. 154(b) by 1127 days.

(21) Appl. No.: 11/766,176

(22) Filed: Jun. 21, 2007

(65) Prior Publication Data

US 2008/0317229 A1 Dec. 25, 2008

(51) Int. Cl.
*H04M 3/42* (2006.01)
*H04L 12/66* (2006.01)

(52) U.S. Cl. ......... 379/201.01; 379/201.07; 379/210.02; 370/352; 455/414.1; 455/417

(58) Field of Classification Search ............. 379/201.01, 379/201.12, 215.01, 210.02, 201.07, 207.15, 379/211.01; 706/45, 46; 455/458, 414.1, 455/417, 415; 370/352
See application file for complete search history.

(56) References Cited

U.S. PATENT DOCUMENTS

| | | | |
|---|---|---|---|
| 5,784,448 A * | 7/1998 | Yaker | 379/215.01 |
| 6,580,787 B1 | 6/2003 | Akhteruzzaman et al. | |
| 6,735,292 B1 * | 5/2004 | Johnson | 379/201.01 |
| 6,941,349 B2 | 9/2005 | Godfrey et al. | |
| 6,976,017 B1 | 12/2005 | Getchius | |
| 7,092,925 B2 * | 8/2006 | Na et al. | 706/46 |
| 7,653,380 B2 * | 1/2010 | Graefen | 455/414.1 |
| 2002/0083028 A1 | 6/2002 | Na et al. | 706/45 |
| 2002/0198007 A1 * | 12/2002 | Zimmerman | 455/458 |
| 2003/0156700 A1 * | 8/2003 | Brown et al. | 379/210.02 |
| 2003/0190019 A1 | 10/2003 | Chefalas et al. | |
| 2004/0264666 A1 * | 12/2004 | Guo et al. | 379/201.12 |
| 2006/0095575 A1 | 5/2006 | Sureka et al. | |
| 2006/0177030 A1 | 8/2006 | Rajagopalan et al. | |

* cited by examiner

*Primary Examiner* — Thjuan K Addy
(74) *Attorney, Agent, or Firm* — Yudell Isidore Ng Russell PLLC

(57) ABSTRACT

A method of and system for filtering telephone calls receives a call to a called party from a caller and determines if the called party has an event scheduled. If the called party has an event scheduled, the system determines if the caller is associated with the event. The system completes the call if the caller is associated with the event. The system sends the call to voice mail if the caller is not associated with said event unless the caller is on an exception list associated with the event, in which case the system completes the call. The system completes the call if it is determined that said called party does not have an event scheduled.

22 Claims, 12 Drawing Sheets

FIG. 2

| 203 | 205 | 207 | 209 | 211 |
|---|---|---|---|---|
| DATE | TIME | EVENT | SUBJECT | INVITEES |
| 07/07/07 | 12:30 13:30 | MEETING | ABC, INC. | EVANS, E. FINN, F. STEVENS, S. |

| 303 | 305 | 307 | 309 | 311 | 313 | 315 |
|---|---|---|---|---|---|---|
| NAME | OFFICE PHONE | MOBILE PHONE | HOME PHONE | COMPANY | ACCOUNTS | CATEGORIES |
| GUNN, G. | 3215551234 | 3215552345 | 3215553456 | ZZZ CORP. | ABC, INC. XYZ, INC. | UPLINE |
| HATCH, H. | 4325554321 | 4325555432 | 4325556543 | ABC, INC. | | CUSTOMER |
| BOYD, B. | 3215556789 | 3215557498 | 3215552341 | | | FRIEND |
| LLOYD, L. | | 3215553124 | 3215552121 | | | FAMILY |

301

| | | |
|---|---|---|
| Subject | Second Quarter Budget | Chair | Stephans, S |
| 405 When | Starts Mon 01/08/2007 09:00 AM<br>Ends Mon 01/08/2007 10:00 AM  1 hour<br>☐ Specify a different time zone<br>☐ Repeats | 411 Where | Location Building 1<br>Rooms 202<br>Resources Projector<br>Online ☐ This is an online meeting |
| 407 Invitees | Required (to) Mon 01/08/2007<br>Optional (cc) Jones, J.; Keller, K.<br>FYI (bcc) Stark, S. | 413 Phone Settings | Allow ● Public ○ Private ○ Custom<br>Exceptions ☐ Family ☐ Upline ☐ Emergency<br>Allow all phone calls to ring through during this meeting. |

| Subject | Second Quarter Budget | | Chair | Stephans, S |
|---|---|---|---|---|
| 405 When | Starts Mon 01/08/2007  09:00 AM<br>Ends Mon 01/08/2007  10:00 AM   1 hour<br>☐ Specify a different time zone<br>☐ Repeats | | 411 Where | Location Building 1<br>Rooms 202<br>Resources Projector<br>Online ☐ This is an online meeting |
| 407 Invitees | Required (to) Smith, S; Brown, B; Allen, A; T<br>Optional (cc) Jones, J; Keller, K.<br>FYI (bcc) Stark, S. | | 503 Phone Settings | Allow ○ Public ● Private ○ Custom<br>Exceptions ☒ Family ☒ Upline ☐ Emergency<br>Allow phone calls from callers invited to this meeting. |

FIG. 5

| | | |
|---|---|---|
| Subject | Second Quarter Budget | |
| 403 | | |
| 405 When | Starts Mon 01/08/2007  09:00 AM  1 hour | Chair Stephans, S  601  409 |
| | Ends Mon 01/08/2007  10:00 AM | |
| | ☐ Specify a different time zone | Location Building 1 |
| | ☐ Repeats | Rooms 202 |
| | | Resources Projector |
| | | Online ☐ This is an online meeting |
| | | 411 Where |
| 407 Invitees | Required (to) Smith, S; Brown, B; Allen, A; T | |
| | Optional (cc) Jones, J; Keller, K. | Allow ○ Public  ○ Private  ● Custom |
| | FYI (bcc) Stark, S. | Exceptions ☒ Family  ☐ Upline  ☐ Emergency |
| | | To ● Ring ○ Vibrate ○ Voice Mail ○ Ignore |
| | | cc ○ Ring ● Vibrate ○ Voice Mail ○ Ignore |
| | | Company ○ Ring ● Vibrate ○ Voice Mail ○ Ignore |
| | | Keyword ○ Ring ○ Vibrate ● Voice Mail ○ Ignore |
| | | Others ○ Ring ○ Vibrate ○ Voice Mail ● Ignore |
| | | 603 Phone Settings |

FIG. 6

ADAPTIVE CALL MONITORING

FIELD OF THE INVENTION

The present invention relates generally to the field of telephone call processing, and more particularly to a method of and system for adaptive call filtering based upon availability information for the called party and the identity of the caller.

BACKGROUND OF THE INVENTION

Currently, there are few options for filtering phone calls other than programming an extension to ring at a specific place according to a specific schedule or manual selection. These options treat all callers in the same way. There is no simple way to direct calls differently depending upon who the caller is.

One known solution to the problem involves using a call direction system, such as Accessline™ to control where or whether a called party's phone rings at a specific time. However, this call direction has to be set up in advance, either through a schedule or by logging in to a system and directing calls on the fly. Call direction is easy if the called party has access to the Internet and enough time to plan accordingly. However, this solution is not practical if the called party is caught in traffic or on the way to a meeting. Furthermore, the called party could be driving to the meeting, having diverted calls to voice mail, when an invitee to the meeting are other important person is trying to reach the called party to cancel the meeting or provide important information.

Another known solution involves systems that can detect a caller ID and statically direct a missed call to a predefined mailbox based on that caller ID. These systems are limited to categorizing voicemail to a predefined mailbox, and none of the systems allow a call to be dynamically routed based on criteria from the called party's calendar or from any other similar input. Current systems have to be programmatically changed and the programming last indefinitely until the next programmatic change.

SUMMARY OF THE INVENTION

Embodiments of the present invention provide methods of and systems for filtering telephone calls. A system receives a call from a caller to a called party and determines if the called party has an event scheduled. If the system determines that the called party has an event scheduled, the system determines if the caller is associated with the event. The system completes the call if the caller is associated with the event. The system sends the call to voice mail if the caller is not associated with said event unless the caller is on an exception list associated with the event, in which case the system completes the call. The system completes the call if it is determined that said called party does not have an event scheduled.

A system may determine if the called party has an event scheduled by accessing a calendar for said called party. In certain embodiments of the present invention, the system may determine if the caller is associated with the event from contextual information, such as the subject of the event, in the calendar entry for the event. The system may then access an address book or contacts list for the called party and determine whether to caller is associated with the context of the event. In other embodiments, the calendar entry for the event may include explicit phone settings that specify how to handle calls.

BRIEF DESCRIPTION OF THE DRAWINGS

FIG. 2 is an illustration of an electronic calendar entry.

FIG. 3 is an illustration of a portion of an electronic address book.

FIG. 4 is an illustration of an embodiment of an event notification.

FIG. 5 is an illustration of a second embodiment of an event notification.

FIG. 6 is an illustration of a third embodiment of an event notification.

DETAILED DESCRIPTION

Figure 1:
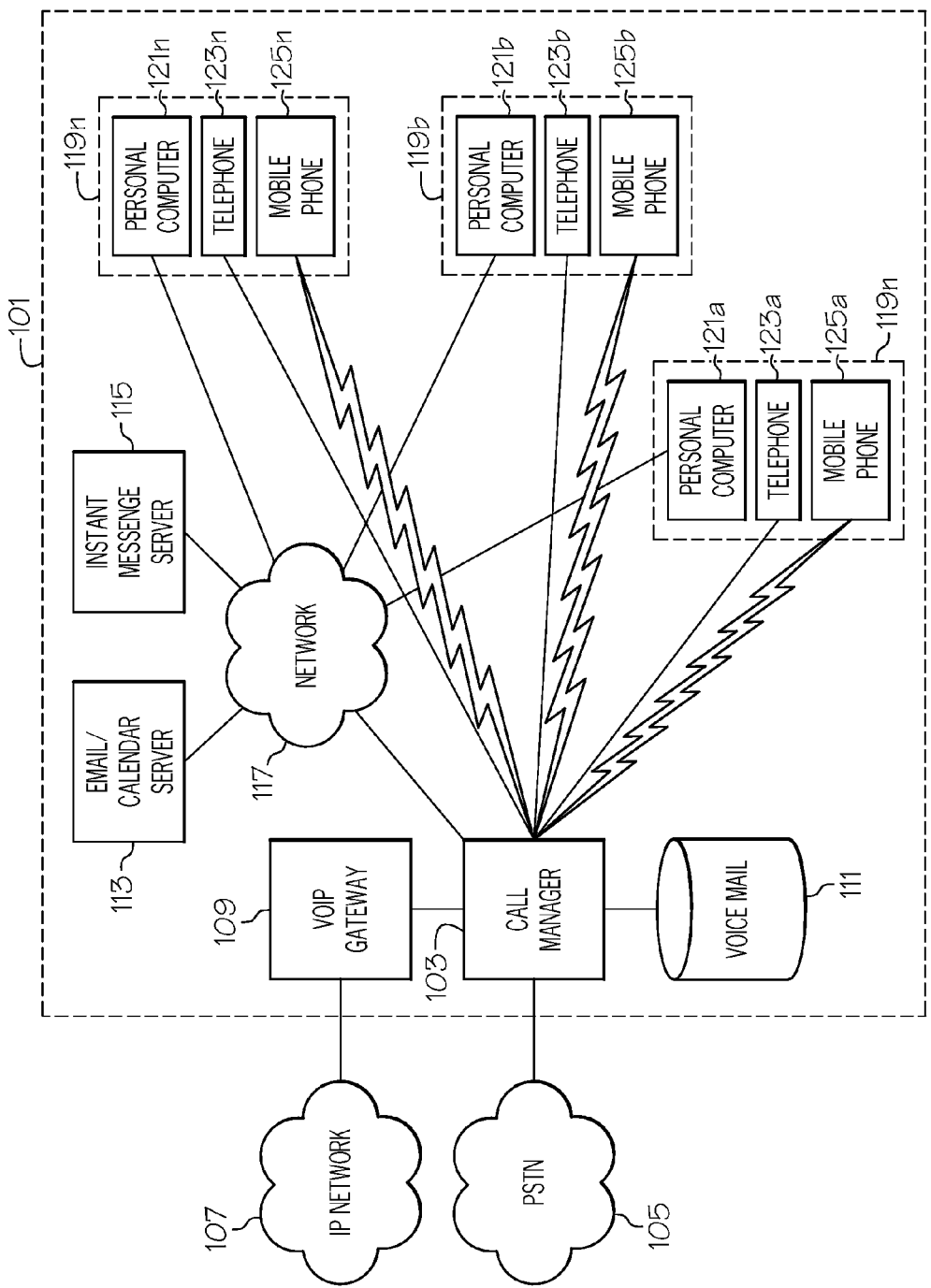
FIG. 1 is a block diagram of an embodiment of a system according to the present invention.

Referring now to the drawings, and first FIG. 1, a system according to the present invention is designated generally by the numeral 101. System 101 includes a call manager 103. Call manager 103 is programmed according to the present invention to direct calls. Call manager 103 is coupled to a public switched telephone network (PSTN) 105. Call manager 13 may also be coupled to an Internet protocol (IP) network, such as the Internet, 107 through a voice over IP (VoIP) gateway 109. Call manager 103 is also coupled to a voicemail system 111.

System 101 also includes an e-mail/calendar server 113 and an instant message server 115. E-mail/calendar server 113 and instant message server 115 are coupled to call manager 103 through a network 117.

System 101 includes a plurality of the sets of user devices 119. A set 119 may include a personal computer 121, a telephone 123, and a mobile phone 125. Personal computer 121 may be a desktop workstation, a laptop computer, a personal digital assistant (PDA), or the like. Each personal computer 121 is coupled to network 117. Telephones 123 and mobile phones 125 are coupled to call manager 103. Those skilled in the art will recognize that wireless telephone infrastructure is omitted from FIG. 1 for purposes of simplicity of illustration.

As will be explained in detail hereinafter, when call manager 103 receives a call, either from outside system 101 from PSTN 105 or IP network 107, and within system 101 from a telephone 123 or mobile phone 125, call manager 103 may access e-mail/calendar server 113 and/or instant message server 115 to determine how to handle the call. In embodiments of the present invention, call filtering information may be stored in e-mail/calendar server 113 and/or instant message server 115. E-mail/calendar server 113 contains electronic calendar and address book information for users of system 101.

Referring to FIG. 2, there is illustrated a calendar entry 201 for a user of system 101. Calendar entry 201 includes a date field, a time field 205, an event field 207, a subject field 209, and a list of invitees 211. calendar entry 201 thus identifies a meeting scheduled for Jul. 7, 2007, from 12:30 to 13:30. The subject of the meeting is ABC, Inc. The invitees to the meeting are Evans, E., Finn, F., as and Stevens, S.

Referring to FIG. 3, there is illustrated a prescient of an address book for a user, designated by the numeral 301. Address book 301 includes fields that identify contacts and contact information. In address book 301 there is a name field 303, an office phone field 305, a mobile phone field 307, a home phone field 309, a company field 311, and accounts field 313, and the categories field 315.

FIG. 4 illustrates a meeting notice or scheduling dialogue 401. Scheduling dialogue 401 includes a subject field 403 into which may be entered the subject of a proposed meeting. A "When" area 405 contains fields into which the date and time of the proposed meeting may be entered. An "Invitees" area 407 includes fields into which the required, optional, and information invitees to the proposed meeting may be entered. Scheduling dialogue 401 includes a "Chair" field 409, which identifies the chair of the meeting. A "Where" field 411 includes fields into which location and resource information may be entered. Finally, a "Phone Settings" area contains radio buttons and checkboxes that allow a user to set up telephone filters for the meeting according to the present invention. In Phone Settings field 413, the setting is "Public," which allows all phone calls to bring through during the meeting. When the chair sends meeting notice 401 or an invitee accepts the meeting notice 401, the meeting information, including the phone settings, is entered into the electronic calendar for the chair or invitee.

FIG. 5 illustrates a scheduling dialogue 501. Scheduling dialogue 501 differs from scheduling dialogue 401 in that in Phone Settings area 503, the "Private" radio button is selected and exceptions check boxes Family and Upline are checked. According to the embodiment of FIG. 5, Private phone settings allow phone calls only from callers invited to the meeting. Exceptions allow calls from identified individuals other than invitees to the meeting to be completed.

FIG. 6 illustrates a scheduling dialogue 601. Scheduling dialogue 601 differs from scheduling dialogue 501 in that in Phone Settings area 603, the custom radio button is selected. Custom phone settings 603 enable a user to filter calls to the meeting with a high degree of granularity.

Figure 7:
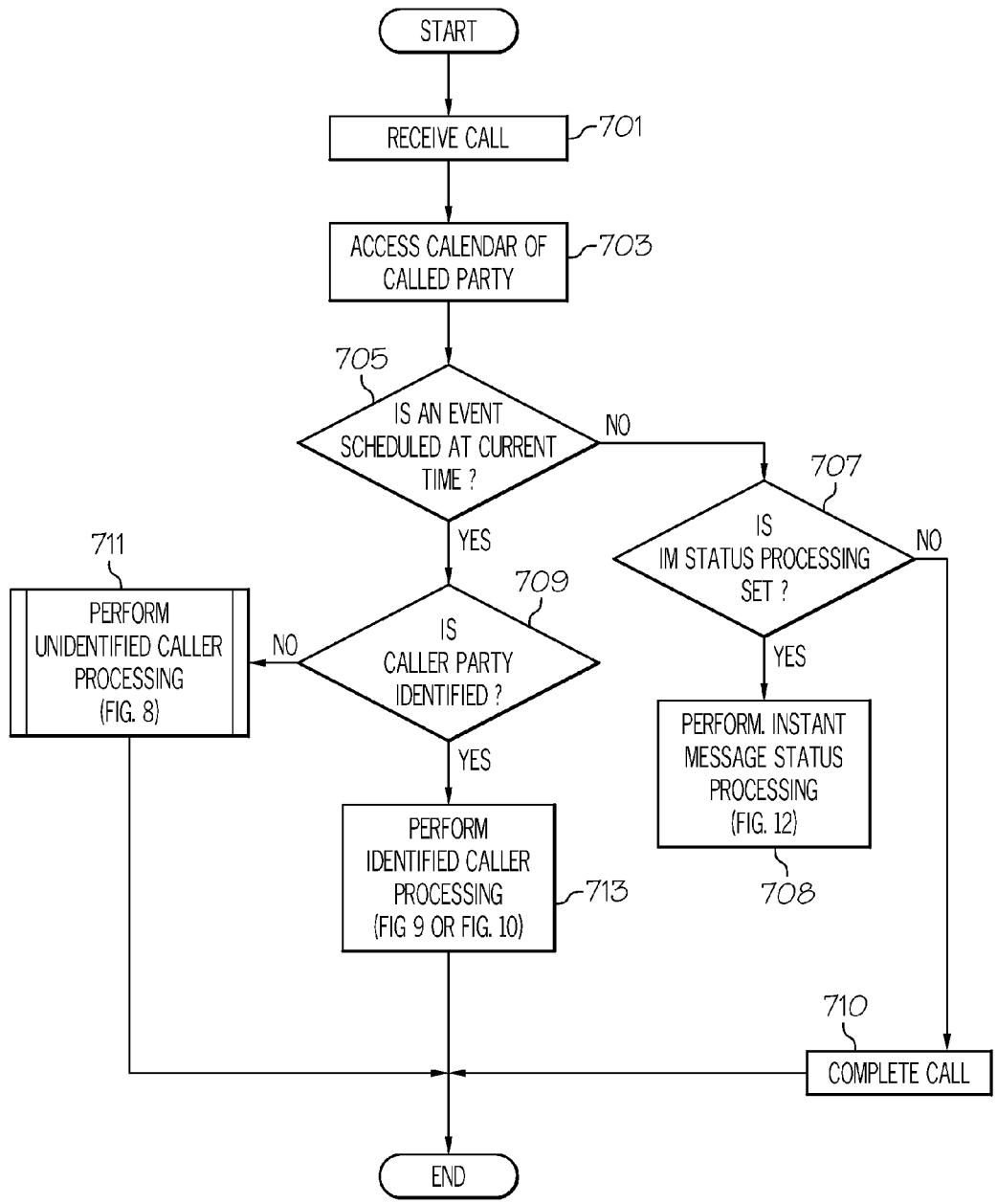
FIG. 7 is a flow chart of an embodiment of call filtering according to the present invention.

FIG. 7 is a high-level flowchart of processing according to the present invention. In embodiments of the present invention, processing according to FIG. 7 may be performed by call manager 103 (FIG. 1). FIG. 7 processing may also be performed in an intelligent mobile phone that has a calendar.

Referring to FIG. 7, a call is received, as indicated at block 701. The call manager accesses the electronic calendar of the called party, as indicated at block 703. The call manager then determines, as indicated at decision block 705, if an event is scheduled at the current time. If not, the call manager determines, as indicated at decision block 707, if instant message (IM) status processing is set. IM status processing according to present invention provides a second layer of call filtration. If IM status processing is set, then the call manager performs IM status process, as indicated generally at block 708 and described in detail with reference to FIG. 12. If IM status processing is not set, the call manager completes the call, at block 710, and processing ends.

Returning to decision block 705, if an event scheduled at the current time, then the call manager determines, as indicated at decision block 709, if the caller is identified. As is known to those skilled in the art, a caller may be identified in a Signaling System 7 (SS7) initial address message (IAM), or according to other call signaling protocols. If the caller is not identified, then the call manager performs unidentified caller processing, as indicated generally at block 711 and illustrated in detail in FIG. 8. If the caller is identified, then the call manager performs identified caller processing, as indicated generally at block 713, details of which are illustrated with reference to FIG. 9 or 10.

Figure 8:
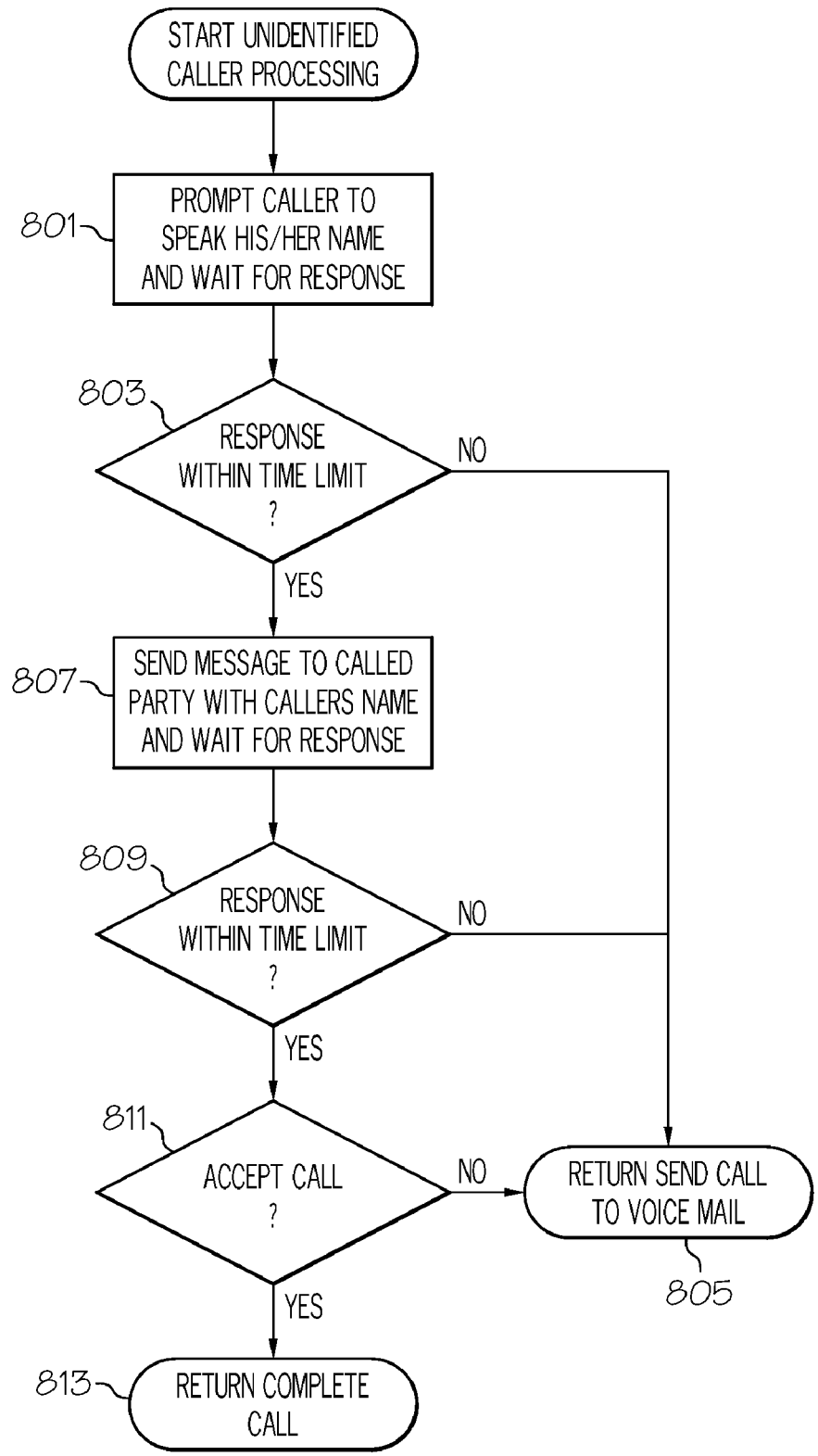
FIG. 8 is a flow chart of an embodiment of unidentified caller processing according to the present invention.

Unidentified caller processing is illustrated in FIG. 8. The call manager prompts the caller to speak his or her name and waits for a response, at block 801. In alternative embodiments, the call manager may prompt the caller to enter his or her telephone number using a telephone key pad. If, as determined at decision block 803, the caller does not respond within a preset time limit, the call is sent to voice mail as indicated at block 805. In an embodiment of the present invention in which the caller is prompted to enter digits, processing may return to block 713 of FIG. 7. If, as determined at decision block 803, a response is received within the time limit, the call manager sends a message to the called party with the caller's name and waits for a response, as indicated at block 807. If, as determined at decision block 809, a response is not received from the called party within a preset response time, then the call is sent to voice mail at block 805. If, as determined at decision block 811, the called party accepts the call, the call manager completes the call, as indicated at block 813.

Figure 9:
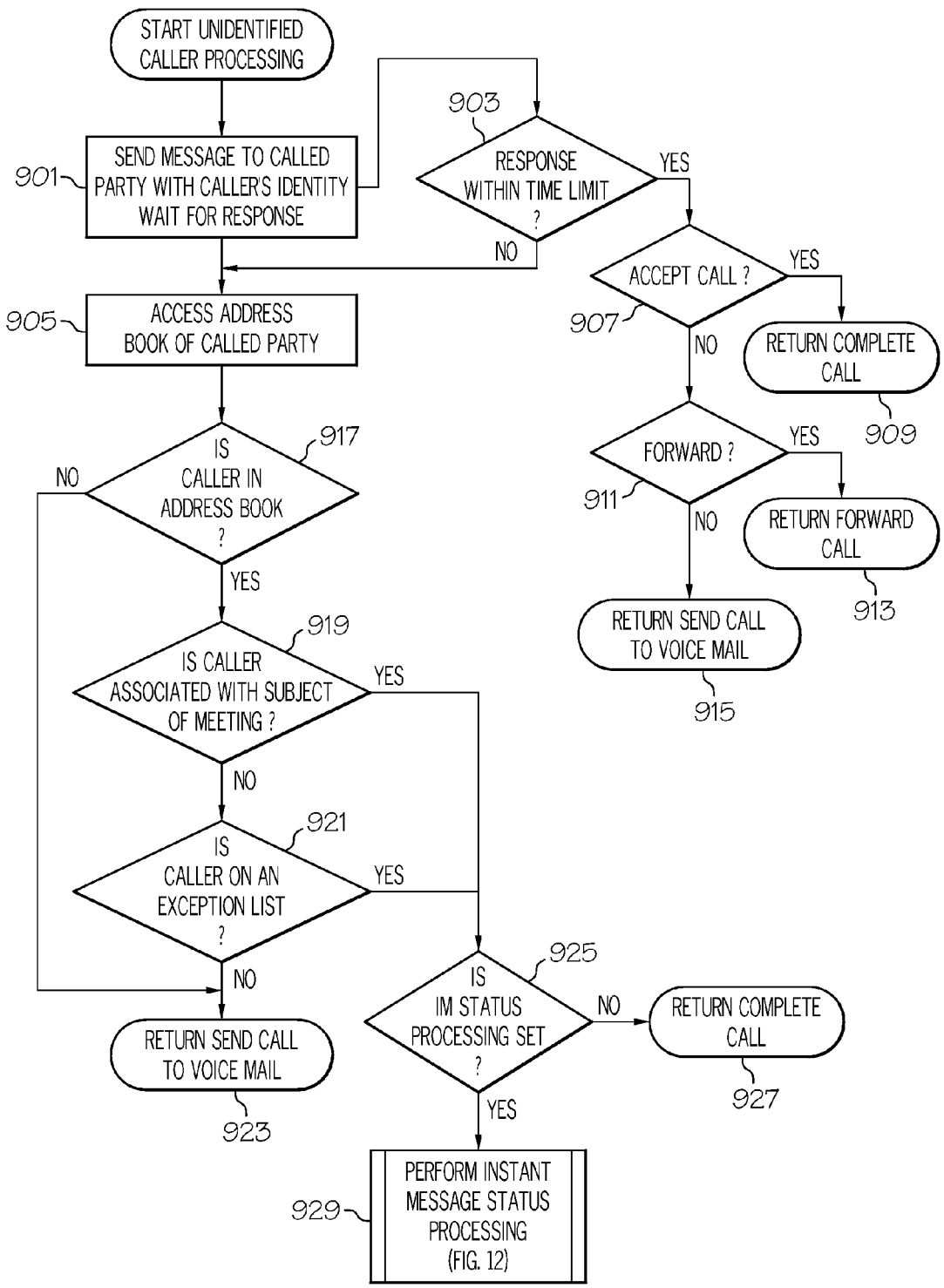
FIG. 9 is a flow chart of an embodiment of identified caller processing according to the present invention.

FIG. 9 illustrates one embodiment of identified caller processing according to the present invention. The call manager may optionally send an instant message advising the called party that a call has been received and asking for instructions for handling the call. Accordingly, the call manager sends an instant message to the called party with the caller's identity and waits for a response, as indicated at block 901. If, as determined at decision block 903, the called party does not respond within a preset time limit, the call manager accesses the address book of the called party, as indicated at block 905. If the called party does respond to the instant message, the call manager determines at decision block 907 if the called party's response is to accept the call. If so, the call manager completes the call, as indicated at block 909, and processing ends. If the called party does not accept the call, the call manager determines at decision block 911 if the called party's response is to forward the call to another number. If so, the call manager forwards the call to that number and processing ends at block 913. If the called party's response is not to forward the call, the call manager sends the call to voice mail and processing ends at block 915.

Returning to block 905, after the call manager has accessed the address book of the called party, the call manager determines if the caller is in the address book, at decision block 917. If not, the call manager sends the call to voice mail, as indicated at block 923, and processing ends. If the caller is in the address book, the call manager determines, at decision block 919, if the caller is associated with the subject of the meeting. If not, the call manager determines, at decision block 921, if the caller is on an exception list. If not, the call manager sends the call to voice mail, as indicated at block 923, and processing ends. If, as determined at decision block 919, the caller is associated with the subject of the meeting, or, as determined at decision block 921, the caller is on an exception list, the call manager determines, at decision block 925, if instant message status processing is set. If instant message status processing is not set, the call manager completes the call, as indicated at block 927, and processing ends. If instant message status processing is set, the call manager performs instant message status processing, as indicated generally at block 929 and described in detail with respect to FIG. 12.

If, as determined at decision block 919, the caller is not associated with the subject of the meeting, the call manager determines, at decision block 921 if the caller is on an exception list. In the embodiment of FIG. 9, an exception list is a list of callers from whom the called party will always take calls. If the caller is on an exception list, then processing continues at decision block 925. If the caller is not on an exception list, then the call manager sends the call to voice mail, at block 923.

Figure 10:
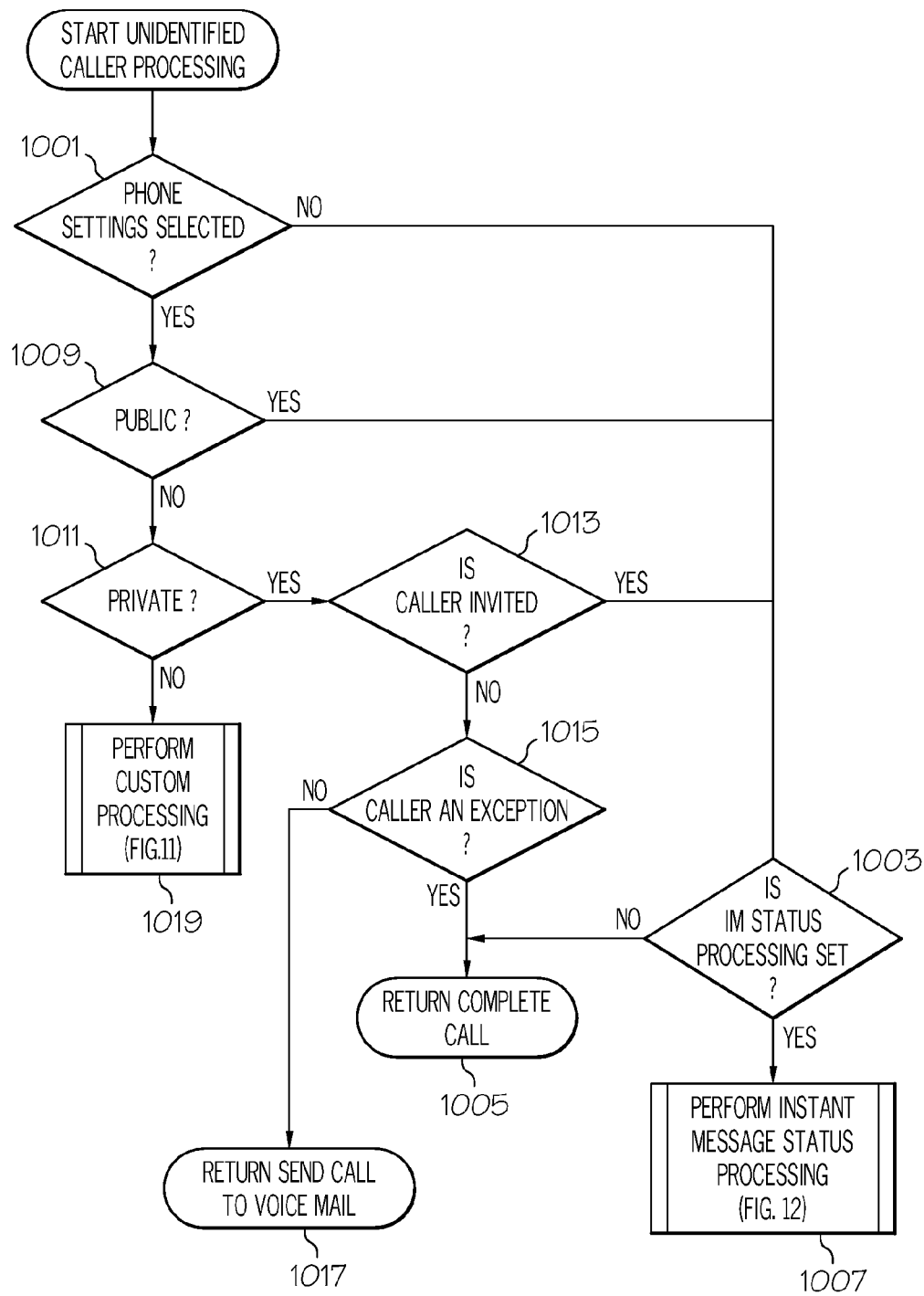
FIG. 10 is a flow chart of an alternative embodiment of identified caller processing according to the present invention.

FIG. 10 is a flow chart of an alternative embodiment of identified caller processing according to the present invention. The call manager determines, at decision block 1001, if phone settings are selected for the event. If not, the call manager determines at decision block 1003 if IM status processing is set. If not, the call manager completes the call, as indicated at block 1005. If instant message status processing is set, then the call manager performs instant message status processing, as indicated at block 1007.

Returning to decision block 1001, if phone settings are selected for the event, then the call manager determines, at decision block 1009 if the phone settings are public. A public phone setting means that all calls will be accepted. If so, processing continues at decision block 1003. If not, the call manager determines at decision block 1011 if phone settings for the event are set to private. As shown in FIG. 5, private phone settings allow calls to be received from invitees to the event and designated exceptions. If the phone setting is private, then the call manager determines, at decision block 1013 if the caller is invited. If so, processing continues at decision block 1003. If not, the call manager determines, at decision block 1015 if the caller is an exception. If not, the call manager sends the call to voice mail, as indicated at block 1017. If, as determined at decision block 1015, the caller is an exception, then the call manager completes the call, as indicated at block 1005. Returning to decision block and 11, if the phone setting is not private, then, by default, a phone setting is custom and the call manager performs custom processing, as indicated generally at block 1019.

Figure 11:
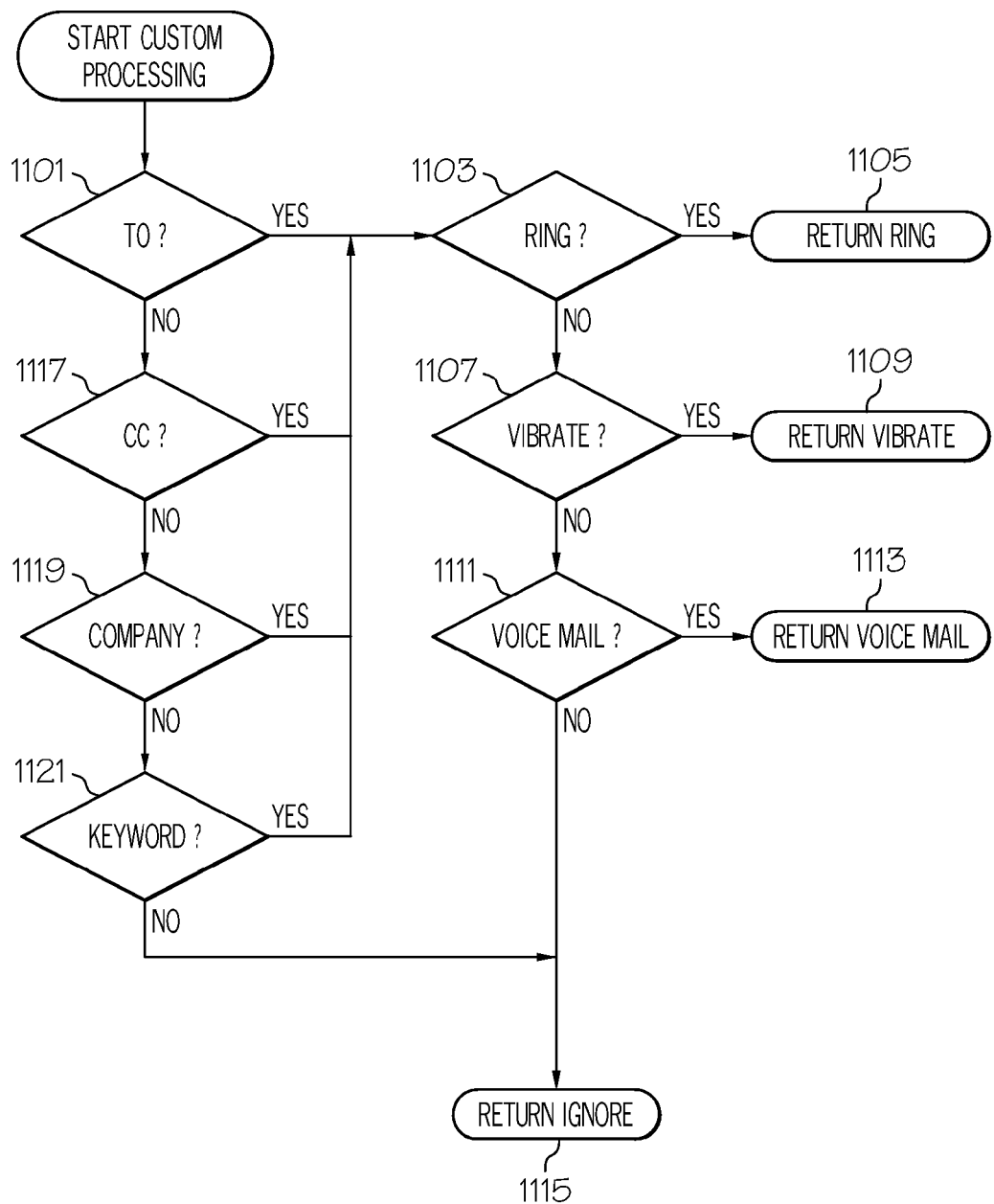
FIG. 11 is a flow chart of an embodiment of custom processing according to the present invention.

FIG. 11 is a flow chart of custom phone setting processing according to an embodiment of the present invention. Custom phone settings are illustrated in area 603 FIG. 6. The call manager determines, at decision block 1101, if the caller is a "to" recipient of the event notification. It will be recalled that a recipient is a required attendee of the event. If so, the call manager determines, at decision block 1103 if the phone setting is ring. If so, the call manager sends a ring signal to the called party, as indicated at block 1105. If, as determined at decision block 1103, a phone setting is not ring, the call manager determines, at decision block 1107 if the phone settings vibrate. The vibrate setting is most applicable in the mobile phone environment. However, more generally, the vibrate setting may be interpreted as a non-audible signal. If the phone setting is vibrate, then the call manager sends a vibrate signal to the called party, as indicated at block 1109. If the phone setting is not vibrate, then the call manager determines, at decision block 1111 if a phone setting his voice mail. If so, the call manager sends the call to voice mail, as indicated at block 1113. If, as determined at decision block 1111, the setting is not voice mail, then the call manager ignores the call, as indicated at block 1115. The call manager may ignore a call by simply allowing a ring tone to continue on the caller's line.

Returning to decision block 1101, if the caller is not a recipient of the event notification, then the call manager determines if the caller is a CC recipient, at decision block 1117. If so, processing continues at decision block 1103. If not, the call manager determines, at decision block 1119 if the caller is associated with a company identifier. It if so, processing continues at decision block 1103. If not, the call manager determines, at decision block 1121, if the caller is associated with a keyword. If so, processing continues at decision block 1103. If not, the call manager ignores the call, as indicated at decision block 1115.

Figure 12:
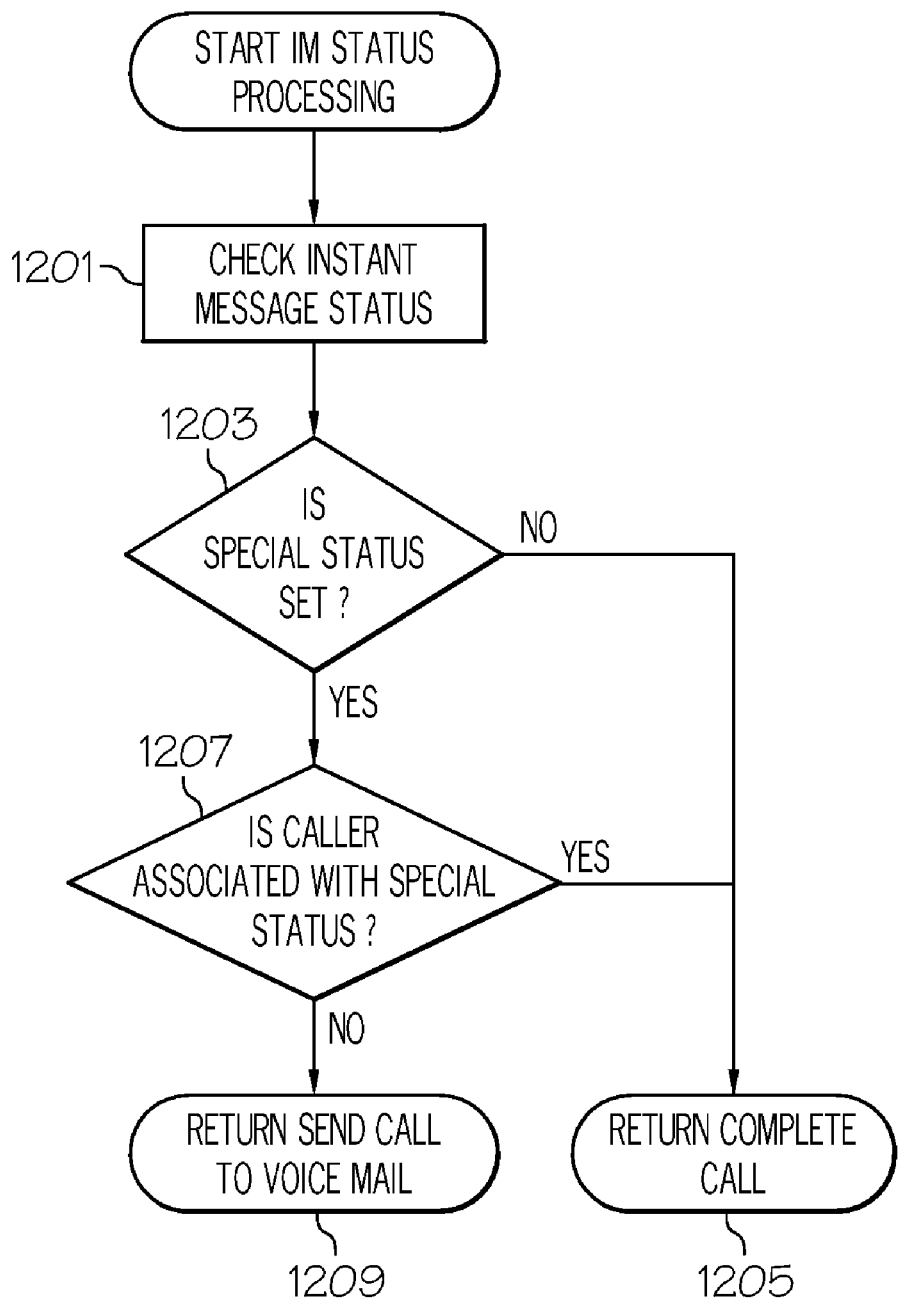
FIG. 12 is a flow chart of an embodiment of instant message status processing according to the present invention.

FIG. 12 is a flow chart of instant message status processing according to an embodiment of the present invention. The call manager checks instant message status, as indicated at block 1201. The call manager determines, at decision block 1203, if a special status is set. If not, the call manager completes the call, as indicated at block 1205. If, as determined at decision block 1203, a special status is set, then the call manager determines, at decision block 1207 if the caller is associated with a special status. If so, the call manager completes the call, as indicated at block 1205. If not, the call manager sends the call to voice mail, as indicated at block 1209. It should be recognized that IM status processing may be performed before calendar filter. Additionally, additional filtering may be performed by a smart wireless phone after the call as been completed by the call manager.

Figure 13:
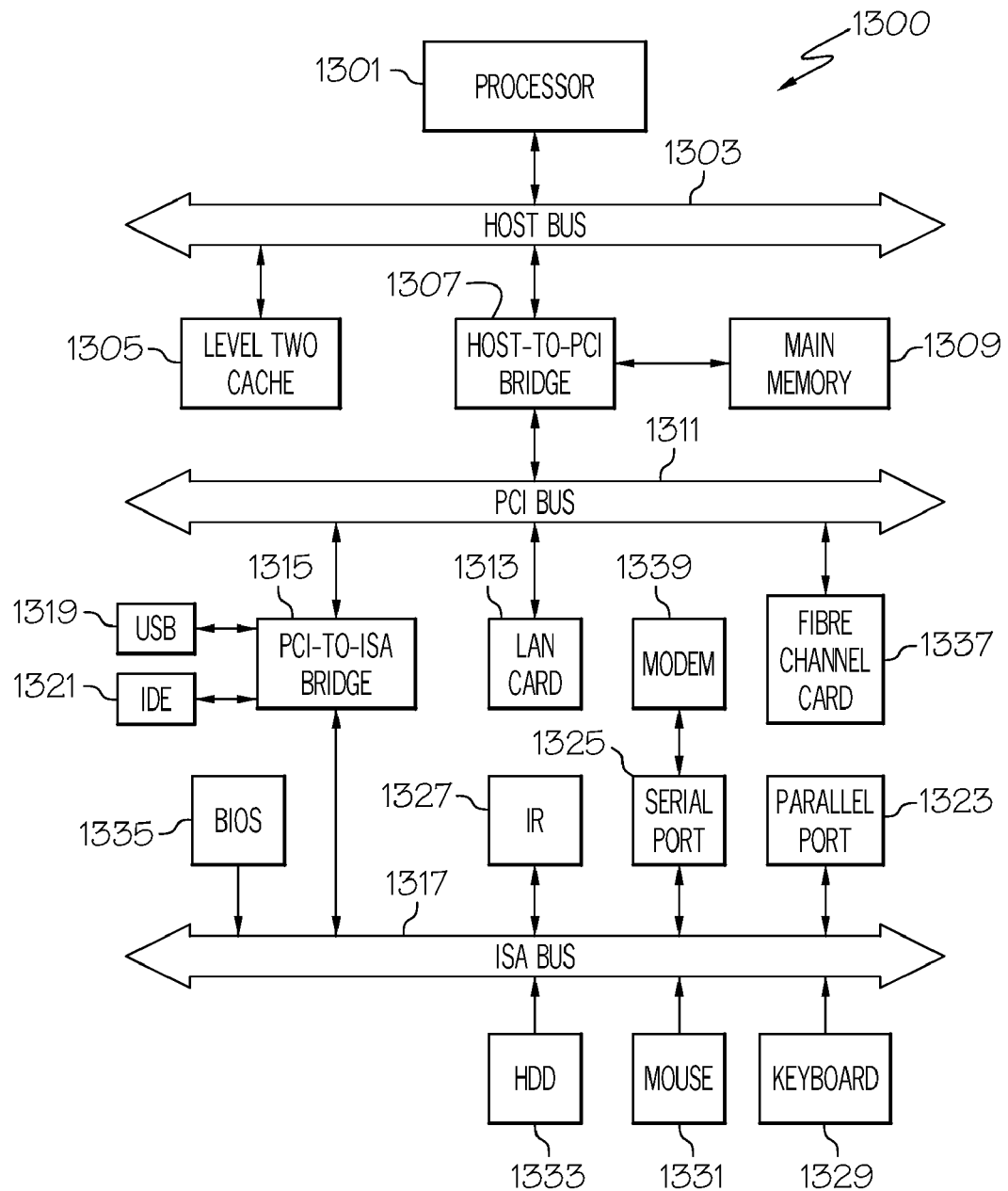
FIG. 13 is a block diagram of a generic information handling system.

Referring now to FIG. 13, there is illustrated a block diagram of a generic information handling system 1300 capable of performing the server and client operations described herein. Computer system 1300 includes processor 1301 which is coupled to host bus 1303. Processor 1301 preferably includes an onboard cache memory. A level two (L2) cache memory 1305 is also coupled to host bus 1303. A Host-to-PCI bridge 1307 is coupled to host bus 1303. Host-to-PCI bridge 1307, which is coupled to main memory 1309, includes its own cache memory and main memory control functions. Host-to-PCI bridge 1307 provides bus control to handle transfers among a PCI bus 1311, processor 1301, L2 cache 1305, main memory 1309, and host bus 1303. PCI bus 1311 provides an interface for a variety of devices including, for example, a local area network (LAN) card 1313, a PCI-to-ISA bridge 1315, which provides bus control to handle transfers between PCI bus 1311 and an ISA bus 1317, a universal serial bus (USB) 1319, and an IDE device 1321. PCI-to-ISA bridge 1315 also includes onboard power management functionality. PCI-to-ISA bridge 1315 can include other functional elements not shown, such as a real-time clock (RTC), DMA control, interrupt support, and system management bus support.

Peripheral devices and input/output (I/O) devices can be attached to various interfaces or ports coupled to ISA bus 1317. Such interfaces or ports may include a parallel port 1323, a serial port 1325, an infrared (IR) interface 1327, a keyboard interface 1329, a mouse interface 1331, and a hard disk drive (HDD) 1333.

A BIOS 1335 is coupled to ISA bus 1317. BIOS 1335 incorporates the necessary processor executable code for a variety of low-level system functions and system boot functions. BIOS 1335 can be stored in any computer readable medium, including magnetic storage media, optical storage media, flash memory, random access memory, read only memory, and communications media conveying signals encoding the instructions (e.g., signals from a network). In order to couple computer system 1300 to another computer system to copy files or send and receive messages over a network, LAN card 1313 may be coupled to PCI bus 1311. Similarly, a Fibre Channel card may be coupled to PCI bus 1313. Additionally, a modem 1339 may be coupled to ISA bus 1317 through serial port 1325 to support dial-up connections.

While the computer system described in FIG. 5 is capable of executing the invention described herein, the illustrated system is simply one example of a computer system. Those skilled in the art will appreciate that many other computer system designs are capable of performing the invention described herein.

One of the preferred implementations of the invention is an application, namely, a set of instructions (program code) in a code module that may, for example, be in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

From the foregoing, it may be seen that processes and systems according to the present invention are well adapted to overcome the shortcomings of the prior art. Wile the present invention has been illustrated and described with reference to exemplary embodiments, those skilled in the art will recognize alternate embodiments. Accordingly, the foregoing description is intended for purposes of illustration rather than limitation.

What is claimed is:

1. A method of filtering telephone calls, the method comprising:
    a computer receiving a call to a called party from a caller;
    said computer performing a filtering on said call, said filtering comprising:
        said computer determining if said called party has a calendar entry associated with a scheduled event, said calendar entry comprising a plurality of fields including a date field, a time field, an event field, a subject field, and a list of invitees;
        responsive to said computer determining that said called party has a scheduled event, said computer determining if said caller is associated with said scheduled event; and
        responsive to said computer determining that said caller is not associated with said scheduled event:
            said computer determining if said caller is an exception on an exception list, wherein an exception is a caller for which the called party will always take calls, and wherein said exception list identifies one or more callers from whom the called party will always take calls; and
            responsive to said computer determining that said caller is an exception, said computer completing said call during said scheduled event.

2. The method as claimed in claim 1, further comprising:
    said computer receiving a second call to the called party from a second caller;
    said computer determining if said second caller is associated with said scheduled event; and
    said computer completing said second call if said second caller is associated with said scheduled event.

3. The method as claimed in claim 1, further comprising:
    said computer receiving a second call to the called party from a second caller;
    said computer determining if said second caller is associated with said scheduled event; and
    said computer sending said second call to voice mail if said second caller is not associated with said scheduled event.

4. The method as claimed in claim 1, wherein said computer determining if said called party has a calendar entry associated with a scheduled event includes said computer accessing a calendar for said called party.

5. The method as claimed in claim 1, wherein said computer determining if said caller is associated with said scheduled event comprises:
    said computer accessing an address book for said called party, said address book having a plurality of fields for identifying contacts and contact information, said fields including at least: a name field, an office phone field, a mobile phone field, a home phone field, a company field, an accounts field, and a categories field.

6. The method as claimed in claim 1, further comprising:
    said computer determining if said caller is identified in at least one of: a Signaling System 7 (SS7), an initial address message (IAM), or according to one or more call signaling protocols; and
    said computer, in response to said caller not being identified, prompting said caller to identify himself or herself.

7. The method as claimed in claim 6, further comprising:
    responsive to said computer receiving said call to said called party from said caller, said computer sending an instant message to said called party, said instant message including an identity of said caller and a request for instructions for handling said call;
    said computer receiving a response to the request for instructions for handling said call from said called party; and
    responsive to said response indicating that said called party accepts the call, said computer completing said call.

8. The method as claimed in claim 1, wherein said computer determining if said caller is associated with said scheduled event comprises said computer determining calendar phone settings for said scheduled event, and wherein said computer completing said call during said scheduled event comprises said computer handling said call according to said calendar phone settings.

9. The method as claimed in claim 8, wherein said computer handling said call according to said calendar phone settings includes:
    said computer completing said call if said calendar phone settings are public, or if said calendar phone settings are private and said caller is an invitee to said scheduled event.

10. A method of filtering telephone calls, the method comprising:
    a computer providing a scheduling dialogue, said scheduling dialogue including an invitee entry area, wherein information about invitees to a proposed meeting may be entered, and a phone settings area that allows a user to set up telephone filters for a meeting;
    said computer sending an event notification to invitees entered in said invitee entry area;
    said computer prompting an invitee receiving said event notification to enter phone settings in said phone settings area;
    in response to acceptance by said invitee of said event notification, said computer entering said phone settings and said invitees entered in said invitee entry area in an electronic calendar of said invitee;
    said computer receiving a call to a called party from said invitee; and said computer accessing a calendar for said called party and determining if said called party has a calendar entry associated with a scheduled event, said calendar entry comprising a plurality of fields including a date field, a time field, an event field, a subject field, and a list of invitees;

responsive to said computer determining that said called party has a scheduled event:
  said computer determining if said invitee is associated with said scheduled event; and
  said computer determining one or more calendar phone settings for said scheduled event;

responsive to said computer determining that said caller is not associated with said scheduled event:
  said computer determining if said invitee is an exception on an exception list, wherein an exception is a caller for which the called party will always take calls, and wherein said exception list identifies one or more callers from whom the called party will always take calls; and
  responsive to said computer determining that said caller is an exception, said computer completing said call during said scheduled event according to said one or more calendar phone settings.

11. A call filtering system comprising:
a computer-readable tangible storage device and a processor;
program instructions, stored on the storage device for execution by the processor, to receive a call to a called party from a caller;
program instructions, stored on the storage device for execution by the processor, to perform a filtering on said call, said program instructions to perform said filtering comprising:
  program instructions, stored on the storage device for execution by the processor, to determine if said called party has a calendar entry associated with a scheduled event, said calendar entry comprising a plurality of fields including a date field, a time field, an event field, a subject field, and a list of invitees;
  program instructions, stored on the storage device for execution by the processor, responsive to determining that said called party has a scheduled event, to determine if said caller is associated with said scheduled event; and
    program instructions, stored on the storage device for execution by the processor, responsive to determining that said caller is not associated with said scheduled event, to determine if said caller is an exception on an exception list, wherein an exception indicates a caller for which the called party will always take calls, and wherein said exception list identifies one or more callers from whom the called party will always take calls; and
    program instructions, stored on the storage device for execution by the processor, responsive to determining said caller is an exception, to complete said call during said scheduled event.

12. The system as claimed in claim 11, further comprising:
program instructions, stored on the storage device for execution by the processor, to complete said call if said caller is associated with said scheduled event; and
wherein the program instructions to determine if said caller is associated with said scheduled event include program instructions to access an address book of the system for said called party, said address book having a plurality of fields for identifying contacts and contact information, said fields including at least: a name field, an office phone field, a mobile phone field, a home phone field, a company field, an accounts field, and a categories field.

13. The system as claimed in claim 11, further comprising program instructions, stored on the storage device for execution by the processor, to send said call to voice mail in response to said caller not being associated with said scheduled event.

14. The system as claimed in claim 11, further comprising program instructions, stored on the storage device for execution by the processor, to complete said call in response to determining that said called party does not have an event scheduled.

15. The system as claimed in claim 11, further comprising:
program instructions, stored on the storage device for execution by the processor, to determine if said caller is identified in at least one of: a Signaling System 7 (SS7), an initial address message (IAM), or according to one or more call signaling protocols;
program instructions, stored on the storage device for execution by the processor, to prompt said caller to identify himself or herself, if said caller is determined not to be identified;
program instructions, stored on the storage device for execution by the processor, to send an instant message to said called party, said instant message including identity of said caller and a request for instructions for handling said call;
program instructions, stored on the storage device for execution by the processor, to receive a response to the request for instructions for handling said call from said called party;
program instructions, stored on the storage device for execution by the processor, to complete said call in response to said response indicating that said called party accepts the call;
program instructions, stored on the storage device for execution by the processor, to forward said call to a voicemail associated with said called party in response to said response indicating that said called party does not accept the call; and
program instructions, stored on the storage device for execution by the processor, to forward said call to a specified phone number in response to said response indicating that said call is to be forwarded to said specified phone number.

16. The method as claimed in claim 6, further comprising:
responsive to said computer receiving said call to said called party from said caller, said computer sending an instant message to said called party, said instant message including an identity of said caller and a request for instructions for handling said call;
said computer receiving a response to the request for instructions for handling said call from said called party; and
responsive to said response indicating that said called party does not accept the call, said computer forwarding said call to a voicemail associated with said called party.

17. The method as claimed in claim 6, further comprising:
responsive to said computer receiving said call to said called party from said caller, said computer sending an instant message to said called party, said instant message including an identity of said caller and a request for instructions for handling said call;
said computer receiving a response to the request for instructions for handling said call from said called party; and responsive to said response indicating that said call is to be forwarded to a specified phone number, said computer forwarding said call to said specified phone number.

18. The method of claim 6, further comprising:
responsive to said computer receiving said call to said called party from said caller, said computer sending an instant message to said called party, said instant message including an identity of said caller and a request for instructions for handling said call;
responsive to said computer not receiving a response to the request for instructions for handling said call from said called party within a preset time limit:
said computer accessing an address book for said called party;
said computer determining whether said caller is associated with the scheduled event or is an exception on said exception list;
in response to said computer determining that said caller is associated with the scheduled event or is an exception on said exception list:
said computer determining whether an instant message status processing is set; and
in response to said computer determining that said instant message status processing is set, said computer performing an instant message status processing on said call.

19. The method of claim 18, said computer performing said instant message status processing further comprising:
said computer determining whether a special status is set;
in response to said computer determining said special status is set:
said computer determining whether said caller is associated with said special status; and
said computer completing said call in response to said computer determining said caller is associated with said special status;
wherein said computer performs said instant message status processing prior to said filtering.

20. The method of claim 18, said computer performing said instant message status processing further comprising:
said computer determining whether a special status is set;
in response to said computer determining said special status is set:
said computer determining whether said caller is associated with said special status; and
said computer forwarding said call to said voicemail in response to determining said caller is not associated with said special status;
wherein said computer performs said instant message status processing prior to said filtering.

21. The system as claimed in claim 15, further comprising:
program instructions, stored on the storage device for execution by the processor, responsive to not receiving a response to the request for instructions for handling said call from said called party within a preset time limit, to:
access an address book for said called party;
determine whether said caller is associated with the scheduled event or is an exception on said exception list; and
in response to determining said caller is associated with the scheduled event or is an exception on said exception list:
determine whether an instant message status processing is set;
complete said call; and
perform an instant message status processing on said call.

22. The system as claimed in claim 15, wherein said program instructions to perform said instant message status processing comprise:
program instructions, stored on the storage device for execution by the processor, to determine whether a special status is set;
program instructions, stored on the storage device for execution by the processor, to complete said call in response to determining said special status is not set; and
program instructions, stored on the storage device for execution by the processor, in response to determining said special status is set, to:
determine whether said caller is associated with said special status;
complete said call in response to determining said caller is associated with said special status; and
forward said call to said voicemail in response to determining said caller is not associated with said special status;
wherein said program instructions to perform said instant message status processing perform said instant message status processing prior to said filtering.

* * * * *